Nov. 27, 1951     T. A. WITEK     2,576,741
CHUCK FOR HOLDING PISTONS
Filed Jan. 26, 1950     2 SHEETS—SHEET 1
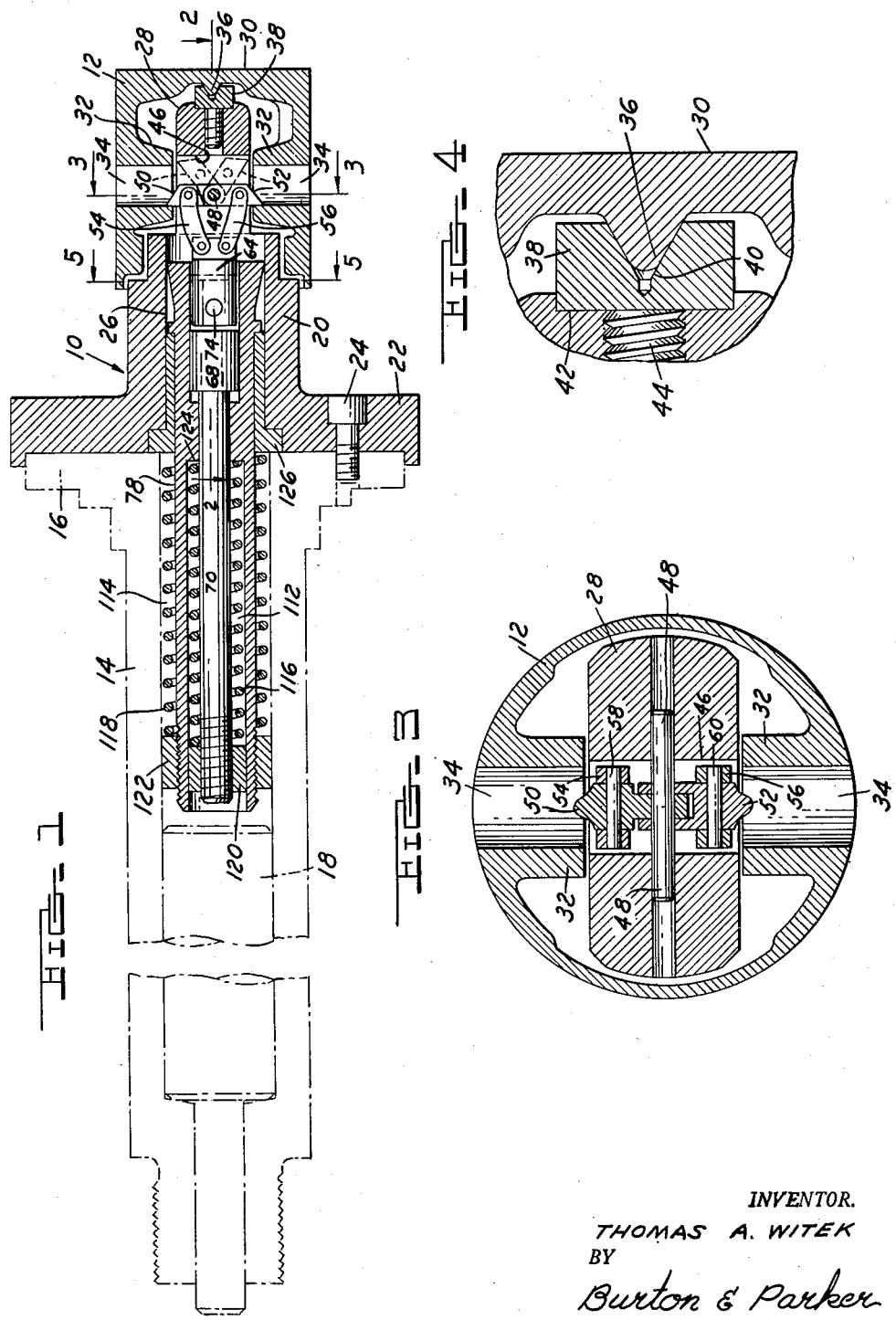
INVENTOR.
THOMAS A. WITEK
BY
Burton & Parker
ATTORNEYS Nov. 27, 1951     T. A. WITEK     2,576,741
CHUCK FOR HOLDING PISTONS
Filed Jan. 26, 1950     2 SHEETS—SHEET 2
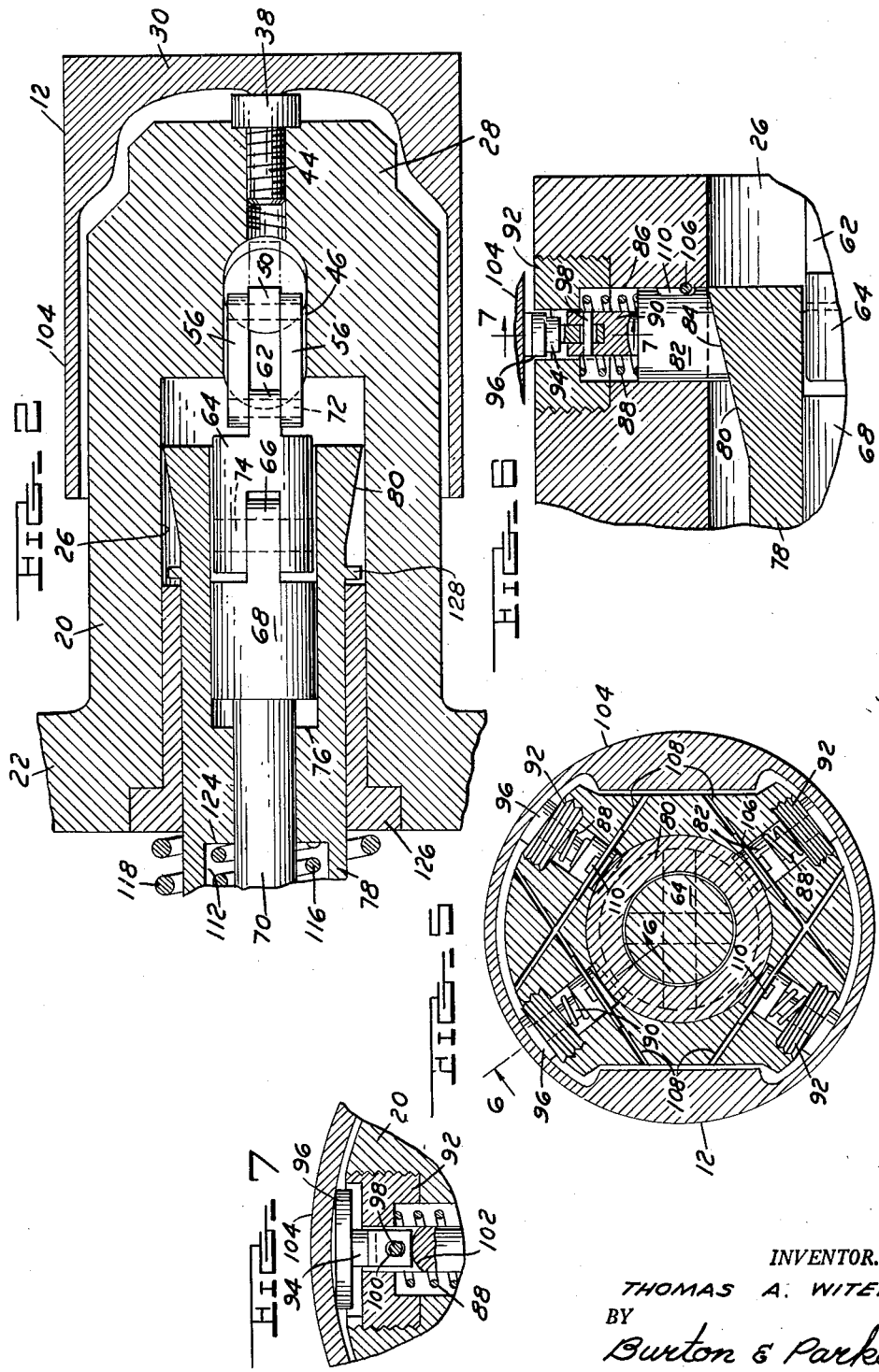
INVENTOR.
THOMAS A. WITEK
BY
Burton & Parker
ATTORNEYS Patented Nov. 27, 1951

2,576,741

UNITED STATES PATENT OFFICE 2,576,741

CHUCK FOR HOLDING PISTONS

Thomas A. Witek, Detroit, Mich., assignor to Improved Tool & Manufacturing Company, Detroit, Mich., a corporation of Michigan Application January 26, 1950, Serial No. 140,593

8 Claims. (Cl. 279—2)

This invention relates to improvements in chucks and particularly to a chuck for holding pistons during the machining thereof.

An important object of the invention is to provide an improved chuck for holding work such as a piston of an internal combustion engine in accurately centered position on the chuck during the machining thereof and in such a manner as not to distort any portion thereof. Another important object of the invention is to provide an improved chuck for this purpose constructed in a novel manner to control the operation of the jaws or arms employed for engaging and holding the piston on the chuck, which control means is entirely contained within the chuck and forms as a resutl thereof a self-contained chuck unit operable to hold the piston on the chuck regardless of whether the chuck is mounted on a machine tool or not. A futher important object of the invention is to provide an improved chuck for rigidly holding a piston in accurately centered position thereon which is composed of parts capable of being economically fabricated and quickly assembled.

In carrying out the invention, the chuck is so constructed that it forms a self-contained power unit including therein its own power means for actuating the moving parts thereof for holding a piston in accurately centered position thereon and without the necessity of using outside forces for this purpose. The chuck is shaped to enter the hollow interior of a piston and is provided on the forward entering end thereof with a rigid part which is shaped in a novel manner to engage a complementary part on the inside face of the head of the piston and center the latter on the chuck. Associated with the entering end of the chuck is a set of arms or jaws operable to engage an interior portion of the piston such as the wrist pin openings thereof and draw the piston onto the chuck until the piston head rigidly abuts the forward end of the chuck. Also carried by the entering end of the chuck is another set of arms or jaws which are operable to engage the inner face of the skirt of the piston at circularly spaced points therearound and accurately center the piston on the chuck.

The two sets of jaws in the chuck are controlled by separate operating members which are mounted axially in the chuck and are reciprocable longitudinally thereof. When moved in one direction the operating members shift the sets of jaws to piston engaging position. The operating members are actuated by novel spring means forming part of the chuck. The spring means comprises two coiled springs, one for each operating member, which are coaxially related to the operating members and separately influence same in the jaw operating direction. Novel means is provided for separately adjusting the tension in order to cause the jaws to engage the piston with the desired amount of pressure, the adjusting means being readily accessible for such purpose. The operating members are so assembled in the chuck body that they project unequal distances from the end of the body opposite to the piston and their respective actions are controlled in timed sequence by the moving part of the machine upon which the chuck is mounted.

A novel feature of the invention is the manner in which the skirt engaging jaws or arms are constructed to provide self centering of the piston on the chuck. Each skirt engaging jaw or arm is provided with a floating head capable of shifting circumferentially of the chuck body to compensate for any non-uniformity of the interior contour of the skirt of the piston.

Various other objects, advantages and meritorious features of the invention will become more fully apparent from the following specification, appended claims and accompanying drawings wherein:

Fig. 1 is a longitudinal sectional view through a chuck constructed in accordance with this invention showing a piston held thereon and showing in dotted outline a part of the machine tool to which the chuck is secured, Fig. 2 is an enlarged longitudinal sectional view through the forward end of the chuck taken along line 2—2 of Fig. 1 and at 90° to the sectional view of Fig. 1, Fig. 3 is a cross sectional view through the forward end of the chuck and the piston thereon taken along line 3—3 of Fig. 1, Fig. 4 is an enlarged sectional view of the forward end of the chuck showing the manner of rigidly centering the head of the piston thereon, Fig. 5 is an enlarged cross sectional view of the forward end of the chuck taken along line 5—5 of Fig. 1, Fig. 6 is an enlarged sectional view of the chuck taken along line 6—6 of Fig. 5 and particularly showing the construction of one of the skirt engaging jaws thereof, and Fig. 7 is an enlarged sectional view taken along line 7—7 of Fig. 6.

Referring particularly to the drawings, the chuck is generally indicated at 10. Held on the forward end of the chuck is an interiorly hollowed piston 12 of the character employed in internal combustion engines. The opposite end of the chuck is constructed for mounting upon a rotating part of a machine tool and such part is illustrated in dotted outline in Fig. 1. The chuck receiving part of the machine may consist of a tubular driving member 14 flanged at its outer end as at 16 to which the chuck is secured. Reciprocably mounted inside the driving member 14 is a rod or plunger 18 which terminates short of the outer flanged end 16 of the member as shown in Fig. 1 and is adapted at the time the chuck is installed to engage the end of the chuck received in the member 14.

The main body portion of the chuck is indicated at 20 and is provided with a circularly flanged portion 22 which is bolted as indicated at 24, or otherwise secured, to the flanged end 16 of the driving member of the machine tool. The body 20 is provided with an axial bore 26 opening out through the rear face of the flange portion 22 thereof and extending forwardly but terminating short of the forward end of the chuck. The forward or piston entering end of the chuck indicated at 28 is of reduced thickness, as shown in Figs. 1, 2 and 3, and is so constructed to pass with clearance the interior wrist pin bearings of the piston.

The piston 12 is generally of the conventional design for use in internal combustion engines and is provided at one end with a head 30. The opposite end of the piston is open and it is through this end that the reduced end or nose 28 of the chuck is passed when the piston is mounted thereon. The piston is provided with inwardly projecting bosses 32—32 located diametrically opposite to one another and forming wrist pin bearings. Each boss 32 is provided with a radially projecting bore 34 in which the wrist pin is later mounted.

The piston illustrated herein differs from the conventional type of piston by being provided on the inner face of the head 30 with a coaxially projecting part or protuberance 36 which is constructed in a novel manner for engaging a rigid part of the forward entering end 28 of the chuck. The part 36 of the piston is preferably shaped, as shown in Figs. 1 and 4, in the form of a cone having a conical surface whose axis coincides with that of the piston. This projection or protuberance is cast integrally with the piston and is especially designed for use with the chuck of the present invention.

The forward part or nose 28 of the chuck is provided with a rigid or non-yielding part which is shaped to engage the projection 36 of the piston head. As shown particularly in Fig. 4 the forward extremity of the chuck carries a solid block 38 which is shaped to engage the conical projection 36 of the piston. For this purpose, the block 38 is provided with a tapering recess 40 whose conical surface is complementary to that of the projection 36 for facial contact therewith as shown in Fig. 4. The block 38 is received in a recess 42 on the forward end of the chuck. The block may form the head of a bolt as shown herein and the threaded shank of the bolt is indicated at 44. For detachable mounting, the shank of the bolt is threaded in an axial bore into the nose 28 of the chuck. It is evident that when the projection 36 is fully seated into the conical recess 40 the block 38 will rigidly hold the piston against further movement toward the machine tool. This serves to center the head end of the piston on the chuck and by virtue of the rigidity of this form of abutment no other means is necessary for centering purposes at the forward end of the chuck.

The piston entering end of the chuck is provided rearwardly of its nose 28 with a transversely extending slot shown at 46 in Figs. 2 and 3 which extends across its narrowest dimension and opens out from the opposite sides of the chuck. Supported upon a pin 48 for pivotal swinging movement are a pair of arms or jaws 50 and 52. The axis of the pin 48 extends crosswise to the chuck and transversely across the slot 46 as shown in Fig. 3. Supported upon the pin in this manner, the two jaws 50 and 52 are capable of swinging movement as shown by a comparison of the dotted and full lines in Fig. 1 from a collapsed inoperative position to a projecting operating position. The arms or jaws 50 and 52 are shaped to engage an interior portion of the wrist and particularly to enter the wrist pin openings 34—34 and engage a side wall portion thereof. In their collapsed position, the two jaws extend in an acute angle forwardly of the pin 48 as shown in Fig. 1. From this collapsed position, the arms or jaws swing rearwardly and outwardly in order to enter the wrist pin openings and upon engagement with the side wall portions thereof tend to advance or draw the piston upon the chuck body.

The two jaws 50 and 52 are moved from inoperative to operating position and return by means of a toggle mechanism comprising two pairs of links 54 and 56, the pair of links 54 being associated with the jaw 50 and mounted to straddle the same and similarly the pair of links 56 being associated with jaw 52 and straddling the same. The two pairs of links are pivotally connected to their respective jaws by pins 58 and 60 which extend parallel to the pivotal axis of the jaws. The rearward extremities of the two sets of links 54 and 56 are pivotally connected to a reduced flat sided extension 62 of a cylindrical body 64. The latter is bifurcated at its rear end as shown in Fig. 2 to straddle a reduced flat sided extension 66 on the forward end of an enlarged head 68 of a central control rod 70. A pin 72 pivotally connects the rear ends of the two sets of links 54 and 56 to the reduced extension 62. Similarly, the rear bifurcated end of the body 64 is pivotally connected by means of a pin 74 to the forward extension 66 of the rod 70.

The enlarged head 68 of the control rod 70 slidingly fits a bore 76 of a longitudinally extending control member 78 as shown in Figs. 1 and 2. However, the cylindrical body 64 which serves as the connecting medium between the sets of links 54 and 56 and the control rod is slightly undersize the bore 76, as shown particularly in Fig. 2. This allows the body 64 to have a limited swinging movement about the axis of the pin 74 which couples it to the head of the control rod. In this manner, any irregularity or non-uniformity in the wrist pin openings 34 may be compensated by a lateral shift of the body 64 to thus assure that both of the jaws 50 and 52 simultaneously engage the wrist pin openings during the action of drawing on the piston.

As shown in Fig. 1, the two control members 70 and 78 project rearwardly a considerable distance beyond the flange 22 of the chuck body and extend relatively deeply into the tubular driving member 14 of the machine to which the chuck is secured. Both control members are mounted for longitudinal reciprocating movement in a forward or rearward direction. It is evident from the description thus far made that when the central control rod 70 is moved forwardly or in the direction of the piston it will cause the links 54 and 56 to move the jaws 50 and 52 to their collapsed inoperative position, as shown in dotted outline in Fig. 1. Conversely, when the control rod 70 moves in the opposite or rearward direction, it will swing the jaws 50 and 52 outwardly and rearwardly to thereby draw the piston fully upon the chuck and rigidly seat the head 30 of the piston on the nose of the chuck.

The control member 78 actuates certain elements which engage the skirt portion of the piston and center the same on the chuck. As shown in Figs. 2 and 6, the forward end of the control member 78 is flared outwardly as at 80 to provide a conical surface in the forward part of the bore 26 of the chuck body. This flared surface 80 functions as a cam to control the outward and inward movement of a plurality of skirt engaging elements which are spaced circularly around the chuck body.

Four such self centering elements or jaws are employed in the illustrated embodiment of the invention and they are shown in Fig. 5 in circularly spaced apart relationship around the axis of the chuck. Each self centering element is similarly constructed and comprises an inner pin 82 having a slanting or inclined bottom face 84 shown in Fig. 6 which engages with the flared end 80 of the control member 78. The pin is movable in a radial bore 86 and spring urged radially inwardly to retracted position by means of coil spring 88. The outer end of the pin is reduced to form an extension 90 which is encircled by the spring 88. One end of the spring 88 seats on the shoulder formed by the juncture of the extension 90 and the larger inner end 82 of the pin and the opposite end of the coiled spring seats on an axially bored plug or insert 92 threaded or otherwise secured into the chuck body at its periphery.

An important novel feature of the invention is the provision on each skirt engaging jaw for contacting the inner surface of the skirt of the piston and providing a limited circumferential movement of the engaging part of the jaw. This is accomplished by providing a second outer pin 94 in each jaw assembly having a head 96 enlarged or elongated in its circumferential dimension as shown by a comparison of Figs. 6 and 7. The base of the pin 94 is pivotally connected to the extension 90 of the inner pin 82 about an axis extending parallel to that of the chuck and piston. This is accomplished, as shown in Figs. 6 and 7, by bifurcating the outer end of the extension 90 and shaping the base end of the pin 94 so that the latter extends through the slot formed by the bifurcated end of the extension 90 and by providing a pivot member 98 which couples the overlapping end portions of the two pins together and permits the outer pin 94 to rock or swing thereon. The hole 100 in the base end of the pin 94 through which the pin 98 extends is elongated slightly radially of the chuck, as shown in Figs. 6 and 7. The thrust of the inner pin 82 on the outer pin 94 is through the base end of the slot of the bifurcation. As shown in Fig. 7, the base of the slot is preferably provided with a rounded contour as indicated at 102 so that a substantially equal force is applied against the outer pin regardless of its angularity with respect to the inner pin. The outer face of the skirt engaging head 96 is preferably arcuately curved with a radius of curvature substantially corresponding to that of the inner face of the skirt portions 104 of the piston.

The inner pins 82 are held from rotation by any suitable means such as wire members 106 received in drilled passages 108 in the chuck body which extension is shown in Fig. 5 on approximate chord lines thereof. The face of the inner pin 82 adjacent each wire member is cut away to form a radially elongated recess 110 through which the wire member 106 associated therewith extends to prevent rotation of the pin but at the same time allowing the pin to move radially when moved by the member 78.

It is apparent from the description of one of the skirt engaging centering jaws that longitudinal movement of the control member 78 rearwardly or away from the piston will cause the inner pin 82 of each jaw to move the outer pin 94 into engagement with the inner surface of the skirt 104. In the event that the skirt portion 104 is irregular or of non-uniform construction, each outer pin 94 of the chuck assembly is capable of a slight circumferential movement relative to the chuck to accommodate or compensate for such irregularity or nonuniformity. It is thus evident that the chuck is provided with a circularly spaced series of floating heads each capable of a slight circumferential movement to compensate for any nonuniformity of the interior contour of the piston head.

As previously recited, the two control members 70 and 78 project rearwardly from the flanged portion 22 of the chuck body. These two control members are coaxially related to the longitudinal center line of the chuck and one within the other. As shown in Fig. 1, the control member 78 is in the form of a sleeve encircling the central control rod 70 and for the major portion of its length being spaced therefrom to provide an annular space or chamber 112. The outer diameter of the control member 78 is less than the internal diameter of the driving member 14 and the two cooperate to form an annular chamber 114. Each of these chambers houses a coiled spring. The inner chamber 114 contains a coiled spring 116 which is operatively associated with the control sleeve member 78 and encircles the same.

The rearward extremities of the two control members 70 and 78 are threaded for receiving adjusting nuts for varying the tension of the coiled springs. The inner coiled spring 116 seats on an adjusting nut 120 which is threaded to the control rod and slidingly fits the bore of the drive member 14. The opposite end of the inner coiled spring 116 is seated on an interior shoulder 124 formed on the sleeve member 78 and it is apparent that the coiled spring 116 yieldingly urges the control rod 70 rearwardly or away from the piston entering end of the chuck to thereby move the jaws 50 and 52 outwardly into engagement with the piston. The outer coiled spring 118 seats on a bushing 126 which serves to slidingly guide the sleeve member 78 in its reciprocable movement in the chuck body. It is evident that the coiled spring 118 yieldingly urges the sleeve member 78 rearwardly or away from the piston entering end of the chuck to thereby move the skirt engaging set of jaws outwardly into engagement with the skirt of the piston. The two springs 116 and 118 form permanent parts of the chuck and function to render the chuck a self contained and self operable device to hold a piston thereon regardless of whether the chuck is mounted in a machine or not.

As is shown in Fig. 1, the two control members 70 and 78 project unequal distances rearwardly of the chuck. During the use of the chuck when the piston is being machined, the plunger 18 in the driving member 14 of the machine is retracted away from the inner ends of the control members. This allows the springs 116 and 118 to move their respective control members in the direction to operate the two sets of jaws for holding and centering the piston on the chuck. However, at the time of the mounting of the piston on the chuck, the plunger 18 is moved toward the chuck and into engagement with the inner ends of the control members 70 and 78 forcing the latter toward the right in Fig. 1 and thereby causing the two sets of jaws to move to collapsed or inoperative position. In this condition, the piston is loosely placed on the nose 28 of the chuck. Thereafter, the plunger 18 of the machine is retracted away from the control members and the latter are free to move to the left in Fig. 1 under the influence of the springs, thereby permitting their respective jaws to move into engagement with the piston.

In the normal piston gripping position of the parts shown in Fig. 1, the sleeve control member 78 extends further rearwardly than the central control rod 70. As the plunger 18 of the machine moves leftwardly in Fig. 1 to permit the control members to operate, the two members move together in unison until the conical projection 36 of the piston head 30 fully seats in the conical recess 40 of the block 38 on the nose of the chuck. At this point, the jaws 50 and 52 have drawn the piston fully on the chuck and by virtue of the rigid engagement of the piston head with the nose of the chuck they are incapable of further swinging movement rearwardly of the device. The control rod 70 is thus held from further longitudinal movement away from the piston. However, the control rod 78 is capable of further longitudinal movement relative to the central control rod 70 and is forced by its spring 118 rearwardly to project its inner end beyond that of the rod 70. This additional movement of the outer sleeve member 78 completes the movement of the skirt engaging centering pins causing them to abut the inner surface of the skirt of hte piston and center the same on the chuck.

It is thus apparent that the two coiled springs 116 and 118 operate in the same direction to urge their respective control members rearwardly of the chuck. The outside spring 118 is slightly stronger than the inside spring 116. For the distance the central control rod 70 moves, the two springs cooperate together to move the two control members to jaw engaging positions. Following stoppage of the central rod 70, the extra strength of the outer spring 118 continues to move the sleeve control member 78 rearwardly and completes the operating movement of the skirt engaging jaws. The outside spring, for example, may have a 700 lb. pressure and the inner coiled spring 116, for example, may have a 600 lb. pressure. The difference of 100 lbs. between these two springs is the force utilized to complete the movement of the outer control member 78. The extent of the rearward movement of the sleeve control member 78 may be limited by any suitable means such as the provision of a circular flange 128 thereon which is abuttingly engageable with the forward end of the bushing 126.

The two nuts 120 and 122 are adjustable to independently vary the tension of the springs associated therewith. When the chuck is removed from the machine the nuts are immediately available for adjustment. The adjustment of the inner spring 116 will vary the force exerted by the rod 70 for drawing the piston onto the chuck. The adjustment of the outer spring 118 will vary the force with which the centering pins engage the skirt. The chuck is thereby capable of being adjusted to accommodate pistons of different dimensions and strengths. The adjustment of the spring force for actuating the centering pins is highly important. Only sufficient pressure should be employed to cause the pins to engage the skirt and center the same, otherwise undue pressure of the pins may distort the skirt wall of the piston and impair the machining thereof.

What I claim is:

1. In a chuck for holding a piston to permit machining of the piston without removal from the chuck, a set of jaws in the chuck movable into engagement with the wrist pin openings of the piston, a second set of jaws movable into engagement with the skirt of the piston, coaxially related members respectively controlling the first set of jaws and the second set of jaws, and spring means coaxially mounted with respect to the members and yieldingly urging the latter in the direction to move the jaws to piston engaging position.

2. In a chuck for holding a piston to permit the machining thereof, a set of jaws movable radially outwardly into engagement with the wrist pin opening of the piston to hold the latter on the chuck for joint rotation therewith, a set of jaws movable radially outwardly into engagement with the skirt portion of the piston to center same on the chuck, a reciprocable longitudinally extending rod operatively connected to one set of jaws to control the movement thereof, a reciprocable longitudinally extending sleeve surrounding the rod and operatively connected to the other set of jaws to control the movement thereof, and a pair of coiled springs of different diameters coaxially mounted with respect to the rod and the sleeve and separately engaging the rod and the sleeve to urge the same in the direction to move the jaws outwardly into piston engaging position.

3. A chuck for holding a piston to permit the machining thereof comprising, in combination, a body portion shaped to enter the hollow interior of a piston, a set of jaws carried by the body portion of the chuck operable to engage the skirt portion of the piston and center the piston upon the chuck, a reciprocable control member operatively associated with each set of jaws with which it is associated to engage the piston, and means for continuing the movement of the member associated with the skirt engaging jaws after the jaws associated with the other member have fully drawn the piston onto the chuck to assure accurate centering of the piston on the chuck.

4. A chuck for holding a piston to permit the machining thereof comprising, in combination, a body portion shaped to enter the hollow interior of a piston, a set of jaws carried by the body portion of the chuck operable to engage a piston and draw the same upon the chuck and to hold the same on the chuck for joint rotation therewith, a second set of jaws carried by the body portion of the chuck operable to engage the skirt portion of the piston and center the piston on the chuck, a reciprocating control member operatively associated with each set of jaws and adapted upon movement in one direction to cause the set of jaws with which it is associated to engage the piston, spring means tensioned between said control members and operable to move one of the members relative to the other member in the direction to effect engagement of its set of jaws with the piston, and a second spring means tensioned between the other control member and a fixed part of the chuck and operable to move the member in the direction to effect engagement of its set of jaws with the piston, said second spring means being of greater strength than said first spring means and overcoming the first spring means when the control member with which the latter is associated discontinues further movement in jaw engaging direction.

5. In a chuck for holding the piston to permit the machining thereof, a body portion of the chuck shaped to enter the hollow interior of the piston, a set of jaws movable radially outwardly to enter the wrist pin openings of the piston to draw the piston onto the chuck and to hold the same thereon for joint rotation therewith, a second set of jaws movable radially outwardly to engage the skirt portion of the piston to center the piston on the chuck, a reciprocating longitudinally extending rod operatively connected to said first set of jaws and adapted upon movement in one direction to cause the jaws with which it is associated to draw the piston onto the chuck, a reciprocating longitudinally extending sleeve surrounding the rod and operatively connected to the other set of jaws and adapted upon movement in the same direction to cause the set of jaws with which it is associated to engage the skirt portion of the piston, spring means tensioned between the sleeve and a fixed part of the chuck and yieldingly urging the sleeve in the direction to move its jaws into engagement with the skirt portion of the piston, said second spring means being of greater strength than said first spring means and overcoming the latter when the rod discontinues movement in jaw engaging direction.

6. In a chuck for holding a piston to permit the machining thereof, a set of jaws movable radially outwardly to enter the wrist pin openings of the piston to draw the piston onto the chuck and to hold the same thereon for joint rotation therewith, a second set of jaws movable radially outwardly to engage the skirt portion of the piston drawn onto the chuck, a pair of longitudinally extending control members one for each set of jaws, means operatively connecting each control member to its respective set of jaws, means mounting said control members for longitudinal reciprocating movement, separate spring means associated with each control member and yieldingly urging the same in the direction to move their respective set of jaws to piston engaging position, one of said control members having a greater distance of travel than the other member and operable during the time it is moved independently of the other member to cause its set of jaws to engage the piston.

7. In a chuck for holding a piston to permit the machining thereof, a set of jaws movable radially outwardly to enter the wrist pin openings on a piston to draw the piston onto the chuck and to hold the same thereon for joint rotation therewith, a second set of jaws movable radially outwardly therewith, a second set of jaws movable radially outwardly to engage the skirt portion of the piston to center the same on the chuck, spring actuated means for moving each set of jaws into piston engaging position, and means providing operation of the spring actuated means associated with the skirt engaging jaws after the piston is fully drawn on the chuck.

8. In a chuck for holding a piston to permit the machining thereof, a body portion shaped to enter the hollow interior of a piston and having a rigid entering end for abutting engagement with the inner face of the head of the piston, means carried by the body portion operable to enter the wrist pin openings of a piston and draw the same fully onto the chuck until the head of the piston abuts the rigid end of the body portion, means carried by the body portion operable to engage the inner surface of the skirt of the piston and center the piston on the chuck, said last means having a limited circumferential movement relative to the chuck to compensate for any nonuniformity of the interior contour of the skirt of the piston.

THOMAS A. WITEK.

REFERENCES CITED

The following references are of record in the file of this patent:

UNITED STATES PATENTS

| Number | Name | Date |
| --- | --- | --- |
| 984,809 | Goodrich | Feb. 21, 1911 |
| 1,265,888 | Dugan | May 14, 1918 |
| 1,846,898 | Packer | Feb. 23, 1932 |
| 1,867,266 | Johnson et al. | July 12, 1932 |
| 1,900,934 | Hudson | Mar. 14, 1933 |
| 1,947,957 | Tillman | Feb. 20, 1934 |
| 2,050,828 | Buell | Aug. 11, 1936 |

OTHER REFERENCES

American Machinist, March 25, 1936, page 275.